(12) United States Patent
Zhang et al.

(10) Patent No.: US 10,732,451 B2
(45) Date of Patent: Aug. 4, 2020

(54) COLOR FILTER SUBSTRATE AND DISPLAY PANEL

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Xinya Zhang, Beijing (CN); Qianqian Zhang, Beijing (CN); Chun Wang, Beijing (CN); Kun Wang, Beijing (CN); Yuqi Liu, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/322,267

(22) PCT Filed: Apr. 28, 2018

(86) PCT No.: PCT/CN2018/085064
§ 371 (c)(1),
(2) Date: Jan. 31, 2019

(87) PCT Pub. No.: WO2018/219088
PCT Pub. Date: Dec. 6, 2018

(65) Prior Publication Data
US 2019/0196260 A1 Jun. 27, 2019

(30) Foreign Application Priority Data
Jun. 1, 2017 (CN) .......................... 2017 1 0406181

(51) Int. Cl.
*G02F 1/1335* (2006.01)

(52) U.S. Cl.
CPC .. *G02F 1/133514* (2013.01); *G02F 1/133512* (2013.01); *G02F 1/133526* (2013.01)

(58) Field of Classification Search
CPC ......... G02F 1/133512; G02F 1/133514; G02F 1/133526; G02F 1/1337; G02F 1/133703;
(Continued)

(56) References Cited

U.S. PATENT DOCUMENTS

| 7,505,190 B2 | 3/2009 | Ozawa |
| 2015/0219958 A1 | 8/2015 | Zhang et al. |

(Continued)

FOREIGN PATENT DOCUMENTS

| CN | 101201512 A | 6/2008 |
| CN | 104730756 A | 6/2015 |

(Continued)

OTHER PUBLICATIONS

International Search Report dated Jul. 20, 2018 issued in corresponding International Application No. PCT/CN2018/085064.
Office Action dated Jul. 31, 2018 issued in corresponding Chinese Application No. 201710406181.1.

*Primary Examiner* — Angela K Davison
(74) *Attorney, Agent, or Firm* — Nath, Goldberg & Meyer; Joshua B. Goldberg

(57) ABSTRACT

The color filter substrate includes a substrate, a plurality of spaced color filter films disposed on the substrate, a black matrix disposed between adjacent color filter films, and a high refractive transparent layer disposed on a side of the black matrix between the color filter films having different colors away from the substrate, the high refractive transparent layer having a refractive index higher than that of a intermediate medium, and the intermediate medium is a medium filled in a display panel comprising va color filter substrate and a counter substrate. The present disclosure is capable of at least partially solving a problem that the color (Continued)

film substrate cannot simultaneously satisfy the requirements of avoiding cross color and increasing transmittance.

10 Claims, 4 Drawing Sheets

(58) Field of Classification Search
CPC ............ G02F 1/133711; G02F 1/1339; G02F 1/13394; G02F 2001/133776; G02F 2001/13398; G02F 2202/13; G09G 2320/0242; G02B 5/22; G02B 5/223; G02B 26/0875; G02B 27/095; G02B 27/0961

See application file for complete search history.

(56) References Cited

U.S. PATENT DOCUMENTS

| | | | |
|---|---|---|---|
| 2015/0362793 A1* | 12/2015 | Ishihara | ............ G02F 1/133512 349/43 |
| 2017/0254935 A1 | 9/2017 | Shinsuke | |
| 2019/0196260 A1 | 6/2019 | Zhang et al. | |

FOREIGN PATENT DOCUMENTS

| | | |
|---|---|---|
| CN | 105514145 A | 4/2016 |
| CN | 106501992 A | 3/2017 |
| CN | 107193150 A | 9/2017 |
| JP | H9-258195 A | 10/1997 |

\* cited by examiner

COLOR FILTER SUBSTRATE AND DISPLAY PANEL

This is a National Phase Application filed under 35 U.S.C. 371 as a national stage of PCT/CN2018/085064, filed Apr. 28, 2018, an application claiming the benefit of Chinese Application No. 201710406181.1, filed Jun. 1, 2017, the content of each of which is hereby incorporated by reference in its entirety.

TECHNICAL FIELD

The present disclosure relates to a field of a display technology, and in particular, to a color film substrate used in a display panel and a display panel.

BACKGROUND

A display panel (for example, a liquid crystal display panel) is formed by aligning an array substrate with a color filter substrate opposite to each other, an intermediate medium (liquid crystal) is filled between two substrates, and the color filter substrate is located on a light outgoing side of the display panel (a side away from a backlight source).

As a resolution (PPI) of a display panel (such as a liquid crystal display panel) increases, a size of a pixel (color filter film) becomes smaller and smaller; however, if a width of a black matrix is also proportionally reduced, a light from one pixel easily passes over the black matrix and enters pixels having other colors adjacent the black matrix, and thus the risk of cross color increases. If the black matrix maintains a large width, the transmittance is lowered. In order to maintain a displaying brightness, it is necessary to increase the brightness of the backlight source, but this will lead to a problem such as increased power consumption, large heat generation, short product life, and poor uniformity of brightness.

That is to say, the above-mentioned color film substrate cannot simultaneously satisfy the requirements of avoiding cross color and increasing transmittance.

SUMMARY

The present disclosure provides a color filter substrate, including: a substrate, and a plurality of spaced color filter films disposed on the substrate, a black matrix disposed between adjacent color filter films, and a high refractive transparent layer disposed on a side of the black matrix between the color filter films having different colors away from the substrate, the high refractive transparent layer having a refractive index higher than that of a intermediate medium, and the intermediate medium is a medium filled in a display panel comprising a color filter substrate and a counter substrate. Optionally, the intermediate medium is filled between the color filter substrate and the counter substrate.

Optionally, the color filter substrate further comprise a low refractive transparent layer disposed on a side of the black matrix between the color filter films having the same color away from the substrate, and the low refractive transparent layer has a refractive index lower than that of the intermediate medium.

Further optionally, the high refractive transparent layer and the low refractive transparent layer are formed by exposing different positions of the same photoresist layer, wherein a light flux of the exposure that forms the high refractive transparent layer is greater than a light flux of the exposure that forms the low refractive transparent layer.

Further optionally, the high refractive transparent layer and the low refractive transparent layer are both formed directly on the black matrix.

Optionally, the color filter substrate further comprises a protective layer, the protective layer covers and contacts the black matrix and the color filter film, and the high refractive transparent layer is disposed on a side of the protective layer away from the black matrix. Optionally, the protective layer includes a first transparent portion covering the color filter film and an opaque portion covering the black matrix between the color filter films having different colors.

Further optionally, the opaque portion is formed by irradiating the protective layer with an ultraviolet light.

Further optionally, the protective layer contains a titanium dioxide sensitizer or a metal halide sensitizer.

Further optionally, the protective layer further includes a second transparent portion covering the black matrix between the color filter films having the same color.

In another embodiment, the present disclosure also provides a display panel comprising:

a counter substrate and a color filter substrate aligned opposite to each other, the color filter substrate is the color filter substrate as described above and is located on a light outgoing side of the display panel; and an intermediate medium filled between the counter substrate and the color filter substrate.

Optionally, the display panel is a liquid crystal display panel; the counter substrate is an array substrate; and the intermediate medium is a liquid crystal.

Figure 1:
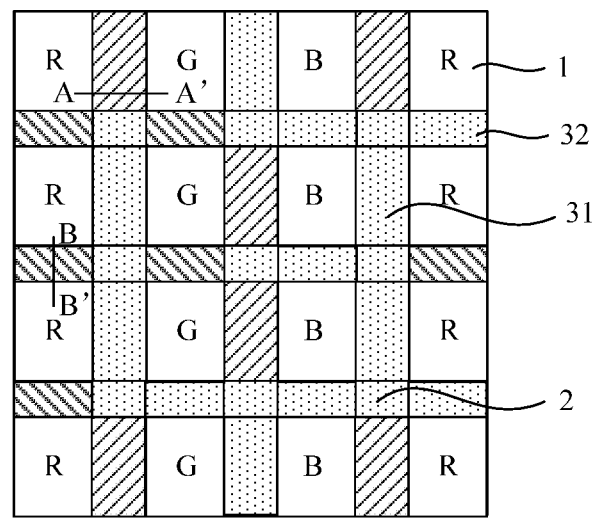
FIG. 1 is a schematic diagram showing a top view structure of a color filter substrate according to an example of the present disclosure.

in which, the reference numerals are: 1. color filter film; 2. black matrix; 31. high refractive transparent layer; 32. low refractive transparent layer; 4. protective layer; 41. opaque portion; 8. counter substrate; 9. substrate

DETAILED DESCRIPTION

In order to enable those skilled in the art to better understand the technical solutions of the present disclosure, the present disclosure is further described in detail below with reference to the drawings and specific embodiments.

In the present disclosure, an expression that A is disposed on B means that A and B are both disposed on the substrate, and A is located on a side of B away from the substrate and is in direct contact with B.

As shown in FIG. 1 to FIG. 7, the present examples provide a color filter substrate.

The color filter substrate is used to form a display panel (such as a liquid crystal display panel) by aligning opposite to a counter substrate (such as an array substrate), the display panel is filled with an intermediate medium (such as a liquid crystal), and the color filter substrate is located on a light outgoing side of the display panel, that is, the light for display is emitted from the display panel after passing through the color filter substrate.

The color filter substrate of the present example includes a substrate 9, a plurality of spaced color filter films 1 disposed on the substrate 9, and a black matrix 2 disposed between adjacent color filter films 1.

As shown in FIG. 1, a plurality of color filter films 1 are disposed on a substrate 9 of a color filter substrate, each of the color filter films 1 corresponds to one pixel and has the same color as the pixel corresponding thereto; there are spaces between the different color filter films 1, and a black matrix 2 for blocking a light is provided in the spaces.

In the color filter substrate of the present example, a high refractive transparent layer 31 is disposed on a side of the black matrix 2 between the color filter films 1 having different colors away from the substrate 9, the high refractive transparent layer 31 has a refractive index higher than that of a intermediate medium, and the intermediate medium is a medium (such as a liquid crystal) filled in a display panel comprising a color filter substrate and a counter substrate 8.

As shown in FIG. 1, the colors of the at least part of adjacent color filter films 1 in the color filter substrate are different (in FIG. 1, the colors of the laterally adjacent color filter films 1 are different). A transparent layer (high refractive transparent layer 31) is further disposed on a side of the black matrix 2 between the color filter films 1 away from the substrate 9, and there is a certain requirement on the refractive index of the transparent layer, that is, the refractive index of the transparent layer should be higher than the refractive index of the intermediate medium filled in the display panel. For example, if the color filter substrate is used for a liquid crystal display panel and the liquid crystal display panel is filled with liquid crystal, the intermediate medium is liquid crystal, and therefore the refractive index of the high refractive transparent layer 31 should be higher than the refractive index of the liquid crystal.

Figure 2:
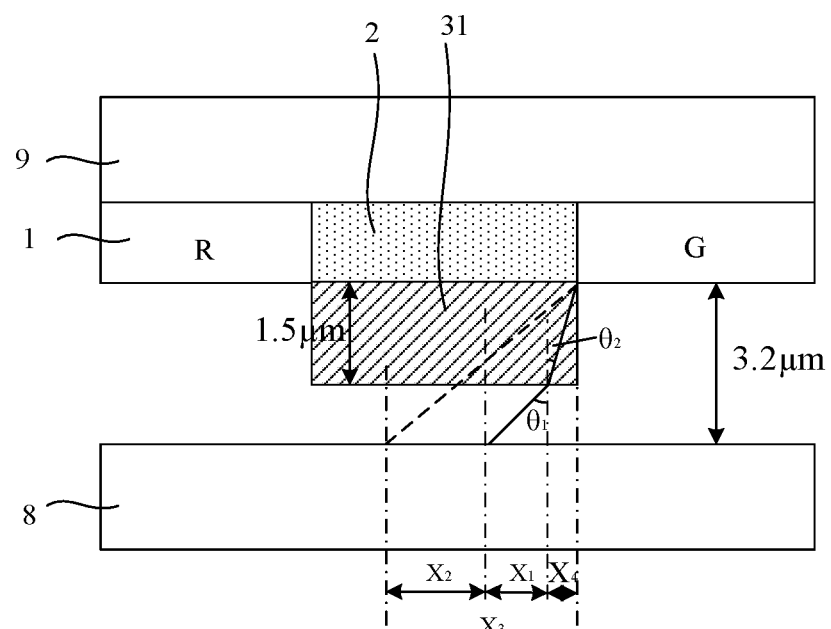
FIG. 2 is a schematic diagram showing the cross-sectional structure along AN in FIG. 1.

Therefore, as shown in FIG. 2, when an obliquely incident light is incident on the high refractive transparent layer 31 from an intermediate medium (such as liquid crystal, not shown), it means that the light enters the optically denser medium from an optically thinner medium. Therefore, the light "converges" in the high refractive transparent layer 31, so that the distance at which the light is shifted after passing through the high refractive transparent layer 31 becomes small, and it is not easy to obliquely enter the color filter film 1 having other colors. Thereby, in the case where the width (i.e. transmittance) of the black matrix 2 is the same, a possibility of occurrence of cross color is lowered, and in the case where a possibility of occurrence of cross color is the same, the width of the black matrix 2 can be reduced, and thus a transmittance is improved. That is, the color film substrate can simultaneously meet the requirements of avoiding cross color and improving transmittance.

The effect of avoiding cross color of the color filter substrate of the present embodiment is calculated in detail below.

As shown in FIG. 2, it is assumed that in a liquid crystal display panel (5.0HD), the Cell Gap (that is, the distance between the two substrates) is 3.2 µm, the width of the black matrix 2 between the color filter films 1 having different colors (BMCD) is 6 µm, the refractive index of the liquid crystal (intermediate medium) is $n_1=1.5$, and the refractive index of the high refractive transparent layer 31 is $n_2=1.8$ and the thickness thereof is 1.5 µm.

In general, a light having an oblique angle $\theta_1$ of 60° (the light represented by a solid line in FIG. 3) is used as a criterion for evaluating whether or not cross color is generated. Therefore, the refraction angle $\theta_2$ of the light obliquely inclined by $\theta_1$ should satisfy the formula: $n_1 \sin \theta_1 = n_2 \sin \theta_2$, so that $\theta_2=46.2°$ can be obtained; further, when the light incident on the high-refractive transparent layer 31 does just not happen to be cross-colored after the refraction, a horizontal distance $X_4$ between the incident point and the boundary of the black matrix 2 is 1.5×tan $\theta_2=1.56$ µm. The horizontal distance $X_1$ between the point where the above light is emitted from the counter substrate 8 and the point where the light is incident in the high refractive transparent layer 31 is (3.2-1.5)×tan $\theta_1=2.94$ µm.

In contrast, in the absence of the high-refractive transparent layer 31, the horizontal distance $X_3$ between the point where the light that does not just happen to be cross-colored (the light represented by the broken line in FIG. 3) exits the counter substrate 8 and the edge of the black matrix 2 is 3.2×tan $\theta_1=5.54$ µm.

In the art, a maximum offset (i.e, an alignment offset) of the black matrix 2 when it can be ensured that the light that is obliquely incident at an angle of 60° does not suffer from cross-coloring is called a cross color margin. It can be seen that after the high refractive transparent layer 31 is disposed, the increased amount of the cross color margin $X_2=X_3-(X_1+X_4)=1.04$ µm. That is to say, by adding the high refractive transparent layer 31 while the other conditions remain unchanged, it can be ensured that the color film substrate is shifted by 1.04 µm more than the case of the prior art when it is aligned, and no cross color is generated. Therefore, the color filter substrate of the present example can function to reduce the possibility of cross coloring.

Optionally, the color filter substrate further comprise a low refractive transparent layer 32 disposed on a side of the black matrix 2 between the color filter films 1 having the same color away from the substrate 9, and the low refractive transparent layer 32 has a refractive index lower than that of the intermediate medium.

As shown in FIG. 1, in the color film substrate, there may be some adjacent color filter films 1 having the same color (in FIG. 1, the colors of the longitudinally adjacent color filter films 1 are the same). A transparent layer (a low refractive transparent layer 32) may also be disposed on a side of the black matrix 2 between the color filter films 1 away from the substrate 9, except that the refractive index of the transparent layer should be smaller than the refractive index of the intermediate medium, for example, smaller than the refractive index of liquid crystal. Assuming that the refractive index $n_1$ of the liquid crystal (intermediate medium) is 1.5, the refractive index $n_3$ of the low refractive transparent layer 32 may be 1.2.

Figure 3:
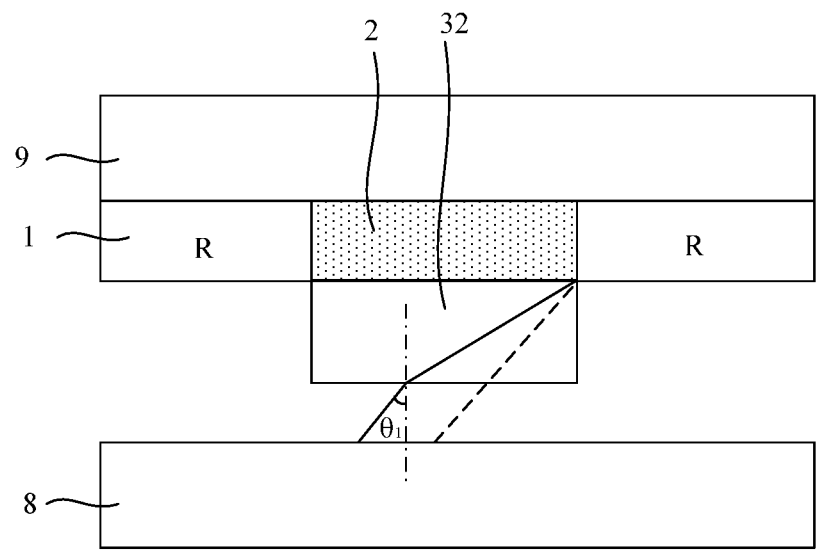
FIG. 3 is a schematic diagram showing the cross-sectional structure along BB' in FIG. 1.

As shown in FIG. 3, when a light is incident on the low refractive transparent layer 32, it means that the light enters the optically thinner medium from the optically denser medium. Therefore, the angle of refraction of the light will be larger than the incident angle $\theta_1$, so that the light will "diverge" and be shifted further. In this way, part of the light originally blocked by the black matrix 2 can be incident on the color filter film 1 and thus emitted, and the emitted light will be "more". However, since the color filter films 1 on both sides of the black matrix 2 at this position have the same color, the increase in the emitted light does not cause a color cross problem either. Therefore, when the black matrix 2 cannot be further reduced in width because it is necessary to provide a spacer (PS) and the lead wire must be blocked, the transmittance can be improved by providing the low refractive transparent layer 32.

Optionally, when the patterning process is performed in the process of preparing the color filter substrate, the high refractive transparent layer 31 and the low refractive transparent layer 32 are formed by exposing different positions of the same photoresist layer, wherein a light flux of a exposure that forms the high refractive transparent layer 31 is greater than a light flux of a exposure that forms the low refractive transparent layer 32.

It is a known technique to form a specific pattern of photoresist by a patterning process. That is, first, a complete photoresist layer is formed on the color filter substrate, and then the photoresist at the position to be retained (the position corresponding to the high refractive transparent layer 31 and the low refractive transparent layer 32) is exposed to be cured, and finally the unexposed photoresist is removed, and the remaining portion is formed into a high refractive transparency layer 31 and a low refractive transparent layer 32.

When exposing the photoresist layer, the higher the light flux used, the faster the polymerization reaction of the photoresist. Therefore, the less the internal cavity after the photoresist is cured, the larger the refractive index. Therefore, as long as different positions of the photoresist layer are exposed by different light fluxes (for example, by using a halftone mask plate), the photoresist layers at the corresponding positions have different refractive indices, thereby forming a high refractive transparent layer 31 (corresponding to a high light flux) and a high refractive transparent layer 32 (corresponding to a low light flux), respectively. In the above manner, the high refractive transparent layer 31 and the low refractive transparent layer 32 can be simultaneously formed in a single patterning process, thereby simplifying the preparation process.

Optionally, both the high refractive transparent layer 31 and the low refractive transparent layer 32 are formed on the black matrix 2.

As shown in FIG. 2 and FIG. 3, as the simplest manner, both the high refractive transparent layer 31 and the low refractive transparent layer 32 can be directly formed on the black matrix 2, that is, both the high refractive transparent layer 31 and the low refractive transparent layer 32 are located on a side of the black matrix 2 away from the substrate 9 and are in direct contact with the black matrix 2.

Optionally, the color filter substrate further comprises a protective layer 4, the protective layer 4 covers and contacts the black matrix 2 and the color filter film 1, and the high refractive transparent layer 31 is disposed on a side of the protective layer 4 away from the black matrix 2. The protective layer 4 includes a first transparent portion covering the color filter film 1 and an opaque portion 41, the opaque portion 41 is covered on the black matrix 2 between the color filter films 1 having different colors.

Figure 4:
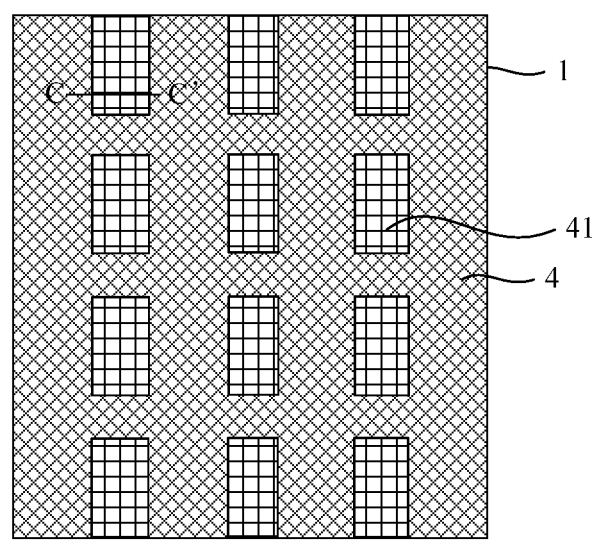
FIG. 4 is a schematic diagram showing a top view structure of another color filter substrate according to an example of the present disclosure (a high/low refractive transparent layer and a black matrix are not shown in FIG. 4)

As shown in FIG. 4, after the black matrix 2 and the color filter film 1 are formed, they are usually covered with a protective layer 4 (OC) to eliminate the step difference and the like, wherein the protective layer 4 between the color filter films 1 having different colors includes an opaque portion 41 (for clarity, the high/low refractive transparent layer and the black matrix are not shown in FIG. 4).

Figure 5:
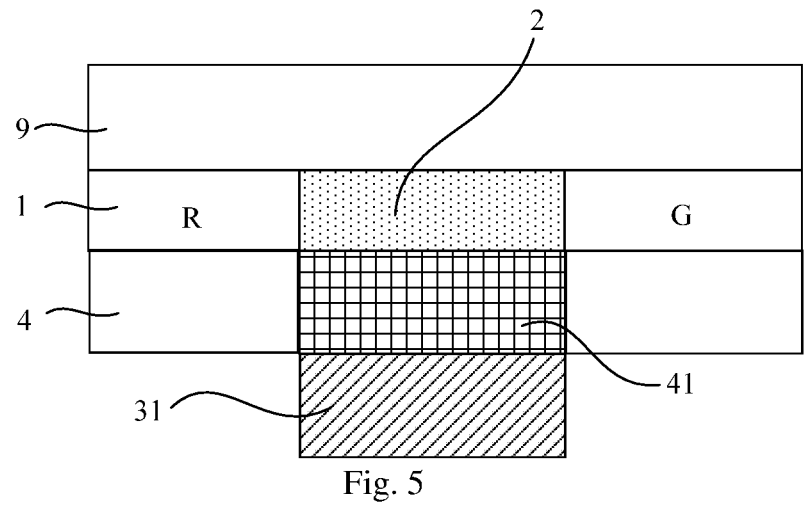
FIG. 5 is a schematic diagram showing the cross-sectional structure along CC' in FIG. 4.

As shown in FIG. 5, if the protective layer 4 corresponding to the black matrix 2 between the color filter films 1 having different colors includes the opaque portion 41, the opaque portion 41 corresponds to forming a part of the black matrix 2, that is, the thickness of the black matrix 2 is increased, so that the light obliquely emitted from the black matrix 2 can be reduced, and a possibility of cross color can be reduced. Of course, since the protective layer 4 is in direct contact with the black matrix 2, the above-mentioned high refractive transparent layer 31, low refractive transparent layer 32, and the like should be disposed on a side of the protective layer 4 away from the black matrix 2 (for example, directly disposed on the protective layer 4).

Figure 6:
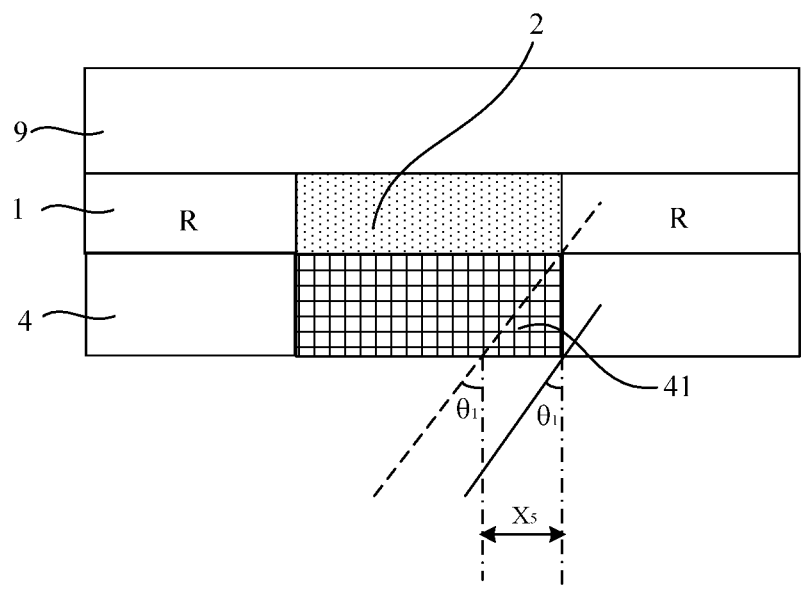
FIG. 6 is a schematic diagram showing the principle of action of the CC' position in FIG. 4 (a high refractive transparent layer is not shown)

As shown in FIG. 6, for the convenience of analysis, the above high refractive transparent layer 31 is temporarily not considered, and when the thickness of the protective layer 4 equals to 1.5 μm, the difference $X_5$ of the range which can be emitted when there is an opaque portion 41 and there is no opaque portion 41 for the light having an oblique angle $\theta 1$ of 60° is 1.5×tan $\theta_1$=2.59 μm. Therefore, by providing the protective layer 4 having the opaque portion 41, the cross color margin can be increased by 2.59 μm. That is, in the case of no cross-color, the black matrix 2 is allowed to be further shifted by 2.59 μm.

Figure 7:
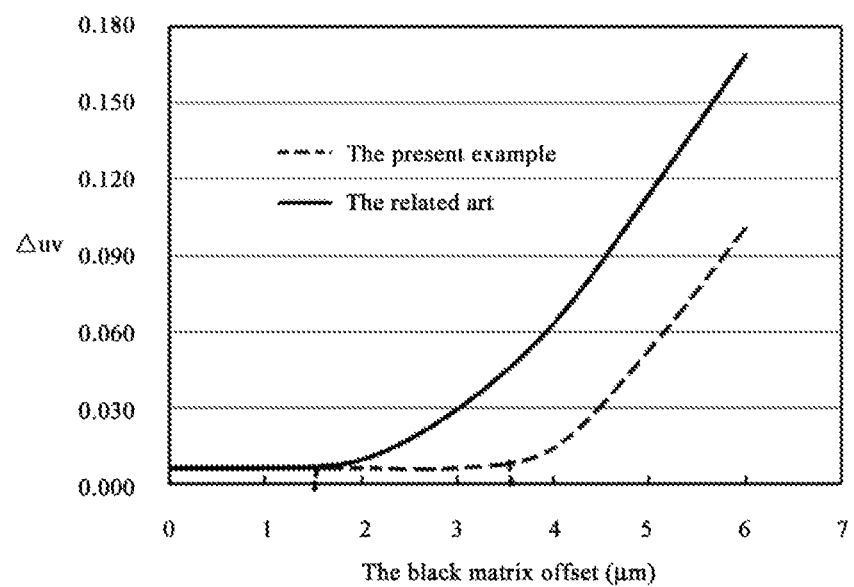
FIG. 7 is a simulation diagram of a cross-color situation caused by an offset of the color filter substrate of the present example and the related art.

FIG. 7 is a cross color situation caused by the offset of the color film substrates of the present example and the prior art simulated using the Techwiz software, wherein the abscissa is the offset amount of the black matrix 2, and the ordinate Δuv is the difference of the color coordinates of the light observed in the forward direction and oblique direction of 60°. The larger the value Δuv, the more severe the cross color. It can be seen that the simulation results also show that the color filter substrate of the example can reduce a probability of occurrence of cross color.

Alternatively, it can also be understood that, in the case where the cross colors may be the same, after the opaque portion 41 is disposed, the size of the open region (or the size of the color filter film 1) in the direction (in a lateral direction) in which the color of the adjacent color filter film 1 is different can be increased by 2.59 μm (increased by 1.295 μm towards both sides respectively), thereby increasing an aperture ratio. Upon calculation, the aperture ratio for the 4.96 HD liquid crystal display panel can be increased by about 8.7%.

Optionally, the opaque portion 41 is formed by irradiating the protective layer 4 with an ultraviolet light. More optionally, the protective layer contains a titanium dioxide sensitizer or a metal halide sensitizer.

That is, the conventional transparent protective layer material may be doped with a photosensitive material selected from titanium oxide ($Ti_2O$), a metal halide (such as silver chloride), and the like. As such, in forming the above opaque portion 41, a complete, transparent protective layer 4 can be prepared firstly, and then an opaque portion 41 is formed by subjecting a portion of the protective layer 4 to the ultraviolet light exposure to make it opaque, thereby forming the opaque portion 41, which is advantageous for simplifying the preparation process.

In particular, if all of the protective layers 4 on the black matrix 2 are opaque portions 41, the above exposure can be performed using a mask plate for preparing the black matrix 2, thereby further simplifying the preparation device.

Optionally, the protective layer further includes a second transparent portion covering the black matrix 2 between the color filter films 1 having the same color.

As shown in FIG. 4, when the colors of part of the adjacent color filter films 1 are the same, the protective layer 4 corresponding to the color filter films 1 may include a transparent portion. As such, the thickness of the black matrix 2 is not increased at these positions, no more light blocking is caused, and the decrease in transmittance can be avoided.

In summary, in the color film substrate of the present disclosure, when the obliquely incident light is incident on the high refractive transparent layer from an intermediate medium (such as liquid crystal), this means that the light enters the optically denser medium from an optically thinner medium. Therefore, the light "converges" in the high refractive transparent layer, so that the distance at which the light is laterally shifted after passing through the high refractive transparent layer becomes small, and it is not easy to obliquely enter the color filter film having other colors. Thereby, in the case where the width (i.e., transmittance) of the black matrix is the same, the possibility of occurrence of cross color is lowered, and in the case where the possibility of occurrence of cross color is the same, the width of the black matrix can be lowered, and thus the transmittance is improved. That is, the color film substrate can simultaneously meet the requirements of avoiding cross color and improving transmittance.

As shown in FIG. 1 to FIG. 7, the present example provides a display panel, comprising:

a counter substrate 8 and a color filter substrate aligned opposite to each other, the color filter substrate is the color filter substrate as described above and is located on a light outgoing side of the display panel; and an intermediate medium filled between the counter substrate 8 and the color filter substrate.

That is to say, the above color film substrate and the other substrate can be formed into a display panel, and the display panel is filled with the above intermediate medium so that each transparent layer can function.

Of course, it should be understood that the color film substrate should be located on the light outgoing side of the display panel.

Optionally, the display panel is a liquid crystal display panel; the counter substrate 8 is an array substrate; and the intermediate medium is a liquid crystal.

Specifically, the display panel may be any product or component that has a display function, such as an electronic paper, a mobile phone, a tablet computer, a television, a display, a notebook computer, a digital photo frame, a navigator, and the like.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

The invention claimed is:

1. A color filter substrate, including:
a substrate,
a plurality of spaced color filter films disposed on the substrate,
a black matrix disposed between adjacent color filter films,
a first transparent layer disposed on a side of the black matrix away from the substrate, between the color filter films having different colors, wherein the first transparent layer has a refractive index higher than a refractive index of an intermediate medium, and the intermediate medium is a medium filled in a display panel comprising the color filter substrate and an array substrate which is disposed opposite to the color filter substrate, and
a second transparent layer disposed on a side of the black matrix away from the substrate, between the color filter films having the same color, wherein the second transparent layer has a refractive index lower than the refractive index of the intermediate medium.

2. The color filter substrate according to claim 1, wherein the first transparent layer and the second transparent layer are formed by exposing different positions of a photoresist layer, wherein a light flux of the exposure that forms the high refractive transparent layer is greater than a light flux of the exposure that forms the second transparent layer.

3. The color filter substrate according to claim 1, wherein both the first transparent layer and the second transparent layer are in direct contact with the black matrix.

4. The color filter substrate according to claim 1, wherein the display panel is a liquid crystal display panel.

5. The color filter substrate according to claim 1, wherein the intermediate medium is a liquid crystal.

6. The color filter substrate according to claim 1, further comprising a protective layer, wherein
the protective layer covers and contacts the black matrix and the color filter film, and the first transparent layer is disposed on a side of the protective layer away from the black matrix.

7. The color filter substrate according to claim 6, wherein the protective layer includes a first transparent portion covering the color filter film and an opaque portion covering the black matrix between the color filter films having different colors.

8. The color filter substrate according to claim 6, wherein the protective layer further includes a second transparent portion covering the black matrix between the color filter films having the same color.

9. The color filter substrate according to claim 6, wherein the opaque portion is formed by irradiating the protective layer with a ultraviolet light.

10. The color filter substrate according to claim 9, wherein the protective layer contains a titanium dioxide sensitizer or a metal halide sensitizer.

* * * * *